Nov. 13, 1956   R. Z. SCHREFFLER   2,770,427
AIRCRAFT CONSTRUCTION

Filed July 16, 1952   3 Sheets-Sheet 1

Robert Z. Schreffler
INVENTOR

Nov. 13, 1956
R. Z. SCHREFFLER
2,770,427
AIRCRAFT CONSTRUCTION
Filed July 16, 1952
3 Sheets-Sheet 2
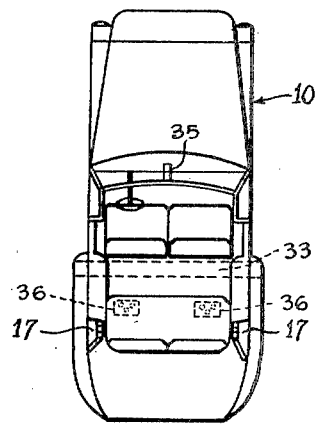
Fig_2
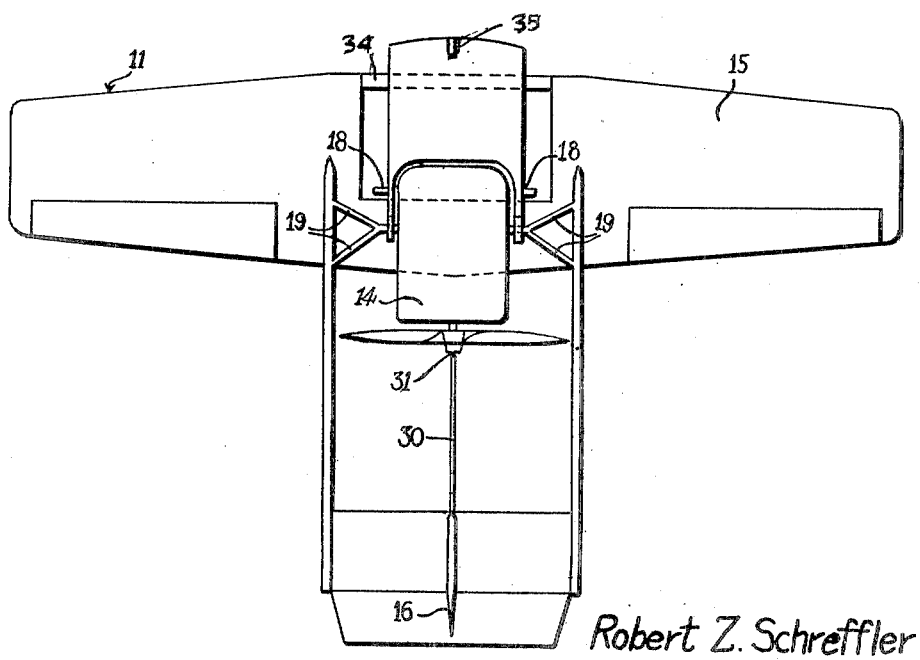
Robert Z. Schreffler
INVENTOR Nov. 13, 1956 R. Z. SCHREFFLER 2,770,427
AIRCRAFT CONSTRUCTION
Filed July 16, 1952 3 Sheets-Sheet 3
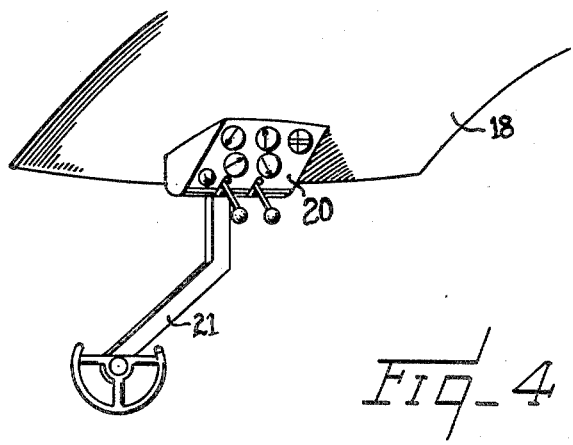
Fig_4
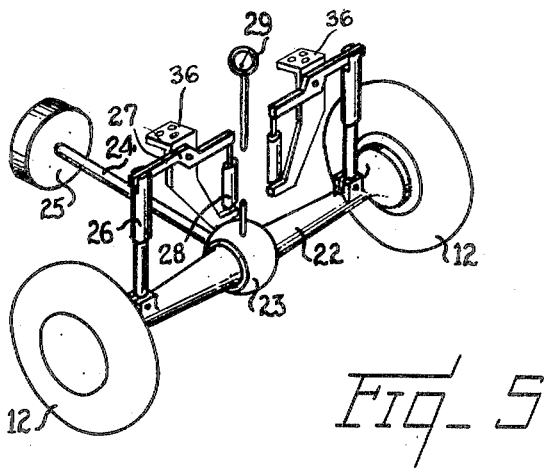
Fig_5
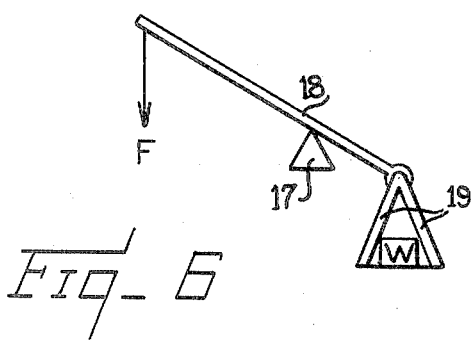
Fig_6
Robert Z Schreffler
INVENTOR

United States Patent Office 2,770,427
Patented Nov. 13, 1956

2,770,427

AIRCRAFT CONSTRUCTION

Robert Z. Schreffler, Huntingdon, Pa.

Application July 16, 1952, Serial No. 299,200

6 Claims. (Cl. 244—2)

This invention relates to aircraft and more especially to means for adapting automotive land or amphibious vehicles for flight.

According to the present invention a buoyant, watertight automotive land vehicle is conditioned for flight by combination with a buoyant, watertight flight unit adapted for assembly with the land vehicle and capable of sustaining the land vehicle air-borne. The functional flight unit is completely self-contained in that it includes a suitable power plant, controls, and wing and control surfaces, and when separated, no part of the flight unit remains with the vehicle unit, or vice-versa. As a result, the required supplementary structure and equipment necessary for flight may be added or removed as a complete unit in conditioning the vehicle for flight or ground travel as desired. The use of a two-control flight system eliminates the need for rudder pedals, hence there are no flight control connections to be made upon assembly of the two units.

There have been numerous prior proposals of aircraft adapted for ground travel. Usually these proposals have involved a collapsible flight structure intended to be manipulated to more compact form to accommodate ground travel, and may even be burdensome as in the case of wing surfaces, for example, which can serve no useful purpose in ground travel but must nevertheless be allotted space so that they may be contracted as by a folding arrangement.

The present invention avoids the above mentioned difficulties by embodying the flight structure in a separate unit which may be readily assembled with or removed from the land vehicle. This arrangement makes it possible to utilize a more or less conventional type of land vehicle for ground travel, and employ an independently separate but complete complementary flight unit to be added to the vehicle for air travel which may be stored and properly serviced when not in use according to the usual methods followed with aircraft.

The aircraft of the present invention is described more in detail below in connection with the accompanying drawing in which:

Fig. 2 is a plan view showing the units disconnected;

Fig. 4 is a fragmentary perspective of the underside of the canopy of the flight unit illustrating the disposition of the controls and instruments of this unit for assembly with the land vehicle;

Fig. 5 is a perspective view of the mounting and general arrangement of the rear wheels and not showing the retractible paddle arrangement; and, Fig. 6 is a simple diagram of the force lines of the lever action of the roof in lifting the flight unit into place.

Figure 1:
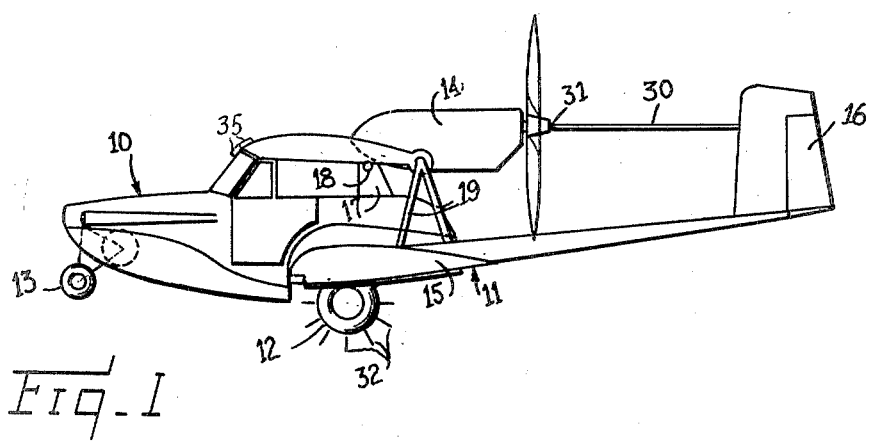
Fig. 1 is a side elevation of a buoyant, watertight amphibious vehicle adapted for flight according to my invention.
Figure 3:
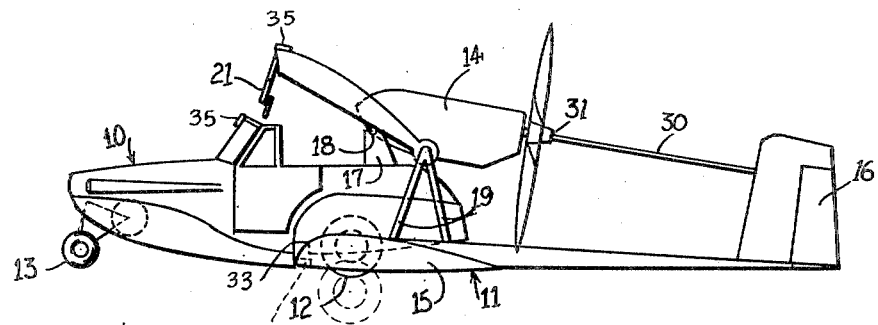
Fig. 3 is a side elevation of the amphibious vehicle with the flight unit resting on the ground prior to being lifted into position by the lever action of the canopy.

As illustrated in the drawing, a buoyant, watertight land vehicle is shown at 10 adapted for flight according to the present invention by assembly with a flight unit indicated generally at 11 (see Fig. 1). The land vehicle 10 is shown for purposes of illustration as taking the form of a roofless, amphibious, automotive vehicle of the passenger type such as would be suitable independently in accommodating passengers for ground travel (Figs. 2 and 3).

The buoyant, watertight vehicle 10 is provided with retractible rear driving wheels 12 arranged as described more in detail below in connection with Fig. 5; and preferably a single retractible front wheel 13 so as to provide the advantages of tricycle type (or any three-wheel arrangement) landing gear, although a four-wheeled type of vehicle may also be used if desired. In any event, the front wheel 13 (or wheels, if two are used) are connected according to usual methods for steering the vehicle 10, and are retractible.

The body of the buoyant, watertight vehicle 10 may be modeled along more or less conventional and nautical lines but preferably incorporating streamlined characteristics in accordance with its adaptability for flight, in addition to ground and water travel design rudiments. The vehicle 10 is further provided according to the present invention with a component power plant, appropriate steering and braking facilities, and related operating instruments, the details of which may be conventional and are accordingly not illustrated in the drawing, plus a mating surface 33 underneath the vehicle.

The flight unit 11 also includes a component power plant indicated generally at 14, suitable wing surfaces 15 and tail structure 16, together with related controls and flight instruments as described more in detail below in connection with Fig. 4. The power plant 14 will usually be most conveniently arranged for operation as a pusher type, as shown in the drawing. Also, a single rudder type of tail structure 16, as illustrated, is well adapted to the arrangement of the flight unit 11 although a twin rudder may also be used. For extra tail bracing, a shaft 30, fixed integral with the tail 16, may be brought forward to the propeller hub and joined to it in a ball and socket swivel assembly 31 to allow the propeller to turn unhindered and yet impart some rigidity to the tail assembly. A mating surface 34 is provided to mate against the corresponding surface 33 on the buoyant, watertight, land vehicle 10.

Being self-contained, the flight unit 11 may, as previously mentioned, be stored when not in use. Usual airport facilities may be employed for this purpose, and the flight unit 11 may thus be handled and serviced generally in accordance with established practice in this respect. Similarly, the land vehicle 10 constitutes a complete automotive unit available for ground travel, but adaptable for flight by combination with the flight unit 11.

The driving wheels may be equipped with retractible paddles or vanes 32 which will aid in water take-offs in a manner similar to a duck's use of his feet when rising in flight from water. These paddles 32 will enable the buoyant, watertight amphibious vehicle 10 to maneuver in water when separate of the buoyant, watertight flight unit 11. With proper designing, the assembly of the two units 10 and 11 may be done on water as well as on land. The buoyant, watertight flight unit wing 15 will act as a sponson on a large flying boat and be buoyant in water. Thus, the units 10 and 11 may be floated into position and then be joined by the clamping function of the fulcrum action.

The arrangement of the buoyant, watertight land vehicle 10 for combination with the flight unit 11 is illustrated in Figs. 2 and 3 of the drawing. For this purpose a fulcrum, indicated at 17 in Fig. 2 is arranged on each side of the vehicle 10 at a point in relation to the positioning of the wing seat or position, and provides a contact point for the lever 18 to permit the flight unit 11 to be lifted up under the vehicle 10 by convenient downward manipulation on the lever 18 (canopy) by the driver or operator, as described more in detail below. Tension members 19, a part of the flight unit 11, fastened to the lever in proximity to the lever's contact point on the fulcrum 17 will lift the flight unit 11 off the ground and into position securely mating the surfaces 33 and 34 together under the vehicle unit 10. Once the canopy 18 is in place and secured, the flight unit 11 is held in place rigidly. The number and arrangement of the fulcrums 17 will depend in the requirements of a particular construction, but in any event they are most satisfactorily placed in relation to the wing position so that they may be used to best advantage to secure a suitable clamping action holding the two units rigidly in place. The canopy 18 becomes the roof of the vehicle 10 when the flight unit 11 has been securely fastened to the vehicle and also becomes the enclosing wind protection, transparent or otherwise, over the occupants.

The complementary arrangement of the canopy 18 of the flight unit 11 for assembly with the land vehicle 10 is illustrated in Fig. 4 of the drawing. As shown, all controls and instruments 20 and 21 are arranged on the underside of the canopy 18 in order to be in proper position when the canopy 18 is closed and secured to the vehicle 10. In this manner, the flight unit 11 may be easily assembled with or removed from the land vehicle 10 as desired through the use of any suitable fastening device or means 35 for securing the canopy 18 to the vehicle 10.

The controls for the flight unit 11 are disposed as illustrated in Fig. 4, so that they may be introduced in position in front of the operator on the vehicle 10, as mentioned above, through the canopy lever action. These controls 20 and 21 comprise the usual engine and flight instruments and controls, as indicated in the drawing, together with a flight control column 21 which is also linked to the rudder 16 making a two-control flight control system which eliminates the need for rudder pedals (not shown). In a standard or regular two-control system as presently approved by the Civil Aeronautics Administration, the two controlling actions of the control column 21 (ailerons and elevators) are ingeniously linked together to control the rudder 16 also, making a foot control for the rudder (rudder pedals) unnecessary. By means of a conventional cannon plug (not shown) the battery and electrical system of the land vehicle 10 may be connected for use in the flight unit 11 and thus avoid duplication of these facilities.

Fig. 5 of the drawing illustrates the manner in which the rear driving wheels 12 are preferably arranged according to the present invention in adapting the vehicle for flight. The driving wheels 12 are shown mounted on a standard automotive axle 22 which meets centrally in a differential 23. A drive shaft 24 extends forwardly from the differential 23 to the transmission means, as at 25, used in coupling the power plant of the land vehicle 10 with the rear driving wheels 12. In most instances, a fluid drive type of transmission will be the best adapted for the purpose of the present invention.

The above described rear driving wheel unit is mounted on vehicle 10 through oleo struts 26 of the type common in aircraft construction. The struts 26 are connected to fulcrum arms 27, the fulcrum point of which constitutes a point of the drive wheel unit mounting attachment to vehicle 10, through a mounting bracket 36 attached to the underside of the vehicle 10 and which extend at their other end to an operating connection with hydraulic retracting cylinders 28, also attached to the mounting bracket 36. The bungees 28 provide the necessary additional shock absorbing distance to cushion the extreme shock of a hard landing, and which would not be adequately provided for by the usual automotive type of wheel mounting. The hydraulic retracting cylinders 28 will provide either more wheel extension beneath the vehicle 10 or if fully depressed will help to retract the wheels 12 up into the vehicle 10 depending upon the length and pressure means of the hydraulic retracting cylinders themselves. The bungees 28 may be replaced by some sort of mechanical manual adjustment so that the operator may adjust his ground clearance either with or without the flight unit 11 attached, or may crank the wheels entirely up into the land vehicle 10 to a fully retracted position.

Fig. 6 of the drawing merely shows the lifting effect as applied to the flight unit 11 from the vehicle unit 10 by the lever 18 (canopy) operated on a fulcrum 17. When the lever 18 has raised the flight unit 11 to a secure contact with the vehicle 10, the lever 18 is then held in that position by a suitable holding or locking mechanism (not shown).

Assuming the buoyant, watertight land vehicle 10 to be in use for ground travel and the flight unit 11 stored, the adaptation and operation of the vehicle 10 for flight may be described as follows. By storing the flight unit 11, as suggested above, so that it may be properly cared for and serviced while idle, this unit 11 may be maintained in condition for assembly and use with vehicle 10. Vehicle 10 may accordingly be driven to the point of storage to effect this assembly when desired. The control housing 20 and control column 21, upon positioning of the canopy 18, extend into the vehicle 10 when wing 15 of the flight unit 11 and canopy 18 are properly positioned. Fastening means 35 are applied to the canopy 18 to secure the assembly and the combined units ready for flight. An important feature of the arrangement of the present invention is that as the land vehicle 10 and flight unit 11 are each self-contained there are no fuel pipe, tubing, or control cable or rod connections to be made at the time of assembly, which is made possible largely because of the two-control usage, which not only simplifies that assembly but eliminates a likely source of operating failure in flight.

Following preparation of the buoyant, watertight land vehicle 10 for flight by assembly of the flight unit 11, the assembled units may be driven by operation of the vehicle 10 to the point of take-off. This includes water operation also, the driving force of the wheels being transmitted to the water by means of the retractible paddles or vanes 32, these being attached to the drive wheel 12. In order to compensate for the additional weight of the flight unit 11 upon the vehicle unit shock struts 26, the hydraulic retracting cylinders 28 may be pumped up so as to provide more clearance between the bottom of the vehicle 10 and the ground, not only for taxiing and take-off but especially in landing when the additional shock clearance is mandatory. The power plant 14 of the flight unit 11 is then started and warmed up in the usual manner, and the flight controls are adjusted for use. For this purpose it is desirable to have the steering control for the land vehicle 10 as small as possible, and preferably constructed so that it may be folded away to a recessed position during flight. For the take-off, the power plants of both the land vehicle 10 and the flight unit 11 can be used which allows the use of a smaller flight unit power plant 14 capable of sustaining the assembled units in flight but possibly requiring the supplementary power of the buoyant, watertight land vehicle power plant for take-offs. Especially in water take-offs it may be more advantageous merely to retract the wheels as far as possible up into the vehicle 10 and use only the flight unit power plant 14; whereas, with a heavy load it may be more to advantage to extend the driving wheels 12 and their paddles 32 and use the additional push to advantage.

As sufficient ground or water speed is obtained, the take-off is maneuvered by means of the control column 21. As soon as the vehicle 10 is air-borne a sharp increase will be registered by tachometer 29 due to spinning of rear wheels 12 and the power plant of the vehicle 10, if used, can be stopped at this indication. The hydraulic retracting cylinders 28 may then retract the driving wheels 12, and the paddle blades 32 also if the take-off was from water. In the event of a water takeoff the front wheel 13 will have already been retracted. Flight from this point on is accomplished through the flight unit 11 which may be controlled and maneuvered in the usual manner.

For landing, the power plant of buoyant, watertight vehicle 10 is again started for correlated operation with the flight unit 11. The vehicle power plant is adjusted to an operating speed giving a tachometer reading corresponding to the landing speed so that the vehicle 10 may be brought to a smooth landing without excessive wear on the rear driving wheels 12 or their operating connections. Once on the ground control may again be effected from the land vehicle 10, which may be driven to the point of storage for flight unit 11 and there re-converted for automotive use by removing the flight unit 11.

The present invention provides a simple and practical means for adapting automotive land or amphibious vehicles for flight, and while the invention has been described above in connection with a preferred arrangement, it will be understood that the invention is applicable generally for the purpose disclosed and such general application is contemplated by the appended claims. Where a land vehicle is referred to in the foregoing description and the following claims, this term is used to include all applicable buoyant, watertight amphibious vehicle arrangements as well. Also, the preferred embodiment of the invention illustrated above may be modified, if desired, to incorporate other types of aircraft design and construction. For example, multi-engined tractor or pusher type power plants may be used in the flight unit rather than a single pusher type as shown, some or all of the wheels of the land vehicle are arranged to be retractible during flight, and different arrangements and numbers of wing and tail surfaces may be used.

Note: This application was intended to replace my original application of Nov. 22, 1946, Serial 711,668, for "Aircraft" which was accidentally, but officially, abandoned for a period of days prior to the official filing date of this application. Since a great deal of the two applications are identical, it may be desirous to refer at this time to the first application in order to prove "invention" prior to the late date of this application of July 16, 1952, Serial 299,200, for "Aircraft Construction."

I claim:

1. An aircraft comprised of a buoyant, watertight, automotive type amphibious vehicle and a buoyant, watertight, flight unit, said buoyant, watertight, flight unit having two-control aileron, elevator, and rudder controls.

2. An aircraft comprising a buoyant, watertight, automotive type amphibious vehicle detachably mounted onto a buoyant, watertight, flight unit, said buoyant, watertight, flight unit being provided with engine controls and flight surface controls, said engine controls and said flight surface controls operable independent and apart from said buoyant, watertight, automotive type amphibious vehicle.

3. An aircraft comprised of a buoyant, watertight, automotive type amphibious vehicle and a buoyant, watertight, flight unit attached thereto, said aircraft being a true roadable aircraft wherein the said buoyant, watertight, automotive type amphibious vehicle is alone equipped with wheels suitable for take-off and landing.

4. In combination, a buoyant, watertight, flight unit and a buoyant, watertight, automotive type amphibious vehicle; said buoyant, watertight, automotive type amphibious vehicle being provided with a plurality of retractable wheels mounted thereon through shock-absorbing strut means attached to one end of a lever, said lever attached to said buoyant, watertight, automotive type amphibious vehicle at its fulcrum, the other end of the said lever attached to one end of a hydraulic retracting cylinder, the other end of the said hydraulic retracting cylinder attached to the said buoyant, watertight, automotive type amphibious vehicle.

5. An aircraft comprising; lifting and controlling surfaces, a fuselage, conventional landing gear, an engine attached thereon to sustain and propel the said aircraft in flight, said engine being provided with a propellor and propellor hub; a bracing member attached at its one end to a swivel in the propeller hub, the other end of the said bracing member attached to the said aircraft, whereby said bracing member imparts rigidity of mounting to said engine and to any said part of the said aircraft.

6. A vehicle adapted to travel on land or water or in the air, comprising; a main body portion and a detachable flight unit portion; said main body portion constituting a combined fuselage and watertight hull of sufficient buoyancy to float the vehicle in water, an open cockpit in said main body portion, a nose wheel and retractable rear driving wheels mounted on said main body portion, a mating surface under the said main body portion, a member mounted on the said main body portion at the rear of the said open cockpit and extending upwardly and forming a fulcrum; said flight unit portion of sufficient buoyancy to remain afloat if detached from said main body portion while in water, comprising a wing, a mating surface thereon to contact said mating surface underneath the said main body portion, tail structure, strut means connecting to and extending upwardly from said wing, a lever means and a power plant; said lever means pivotally connected on a transverse axis to the upper ends of said strut means and extending forwardly and bearing downwardly on said fulcrum at a point spaced forwardly from the upper ends of the said strut means, said lever means forming a cover for the said open cockpit and carrying a downwardly extending control column at the forward end thereof, said power plant supported by said strut means, latch means for holding down the forward end of said lever means whereby the said strut means, said wing, said power plant, and said mating surfaces are fixedly held relative to each other in position for flight.

References Cited in the file of this patent
UNITED STATES PATENTS

| | | |
|---|---|---|
| 1,704,076 | Carroll | Mar. 5, 1929 |
| 2,350,608 | Griffith | June 6, 1944 |
| 2,371,687 | Gerhardt | Mar. 20, 1945 |
| 2,410,234 | Read | Oct. 29, 1946 |
| 2,499,350 | Bennett | Mar. 7, 1950 |
| 2,562,491 | Hall | July 31, 1951 |
| 2,619,184 | Hall | Nov. 25, 1952 |
| 2,624,530 | Hanssen | Jan. 6, 1953 |

FOREIGN PATENTS

| | | |
|---|---|---|
| 994,341 | France | Aug. 8, 1951 |